United States Patent
Helfinstine et al.

(10) Patent No.: US 8,074,518 B2
(45) Date of Patent: Dec. 13, 2011

(54) SYSTEMS AND METHODS FOR MEASURING THE SPECIFIC MODULUS OF CELLULAR CERAMIC BODIES

(75) Inventors: John David Helfinstine, Big Flats, NY (US); Robert A McIntosh, San Antonio, TX (US); Lisa M Noni, Horseheads, NY (US); Zhiqiang Shi, Painted Post, NY (US); Sujanto Widjaja, Corning, NY (US); David John Worthey, Elmira, NY (US)

(73) Assignee: Corning Incorporated, Corning, NY (US)

( * ) Notice: Subject to any disclaimer, the term of this patent is extended or adjusted under 35 U.S.C. 154(b) by 717 days.

(21) Appl. No.: 12/197,429

(22) Filed: Aug. 25, 2008

(65) Prior Publication Data

US 2010/0043556 A1 Feb. 25, 2010

(51) Int. Cl.
*G01N 29/07* (2006.01)
(52) U.S. Cl. ............................. 73/598; 73/597; 73/605
(58) Field of Classification Search .................... 73/579, 73/597, 598, 602, 599, 600
See application file for complete search history.

(56) References Cited

U.S. PATENT DOCUMENTS

| | | | |
|---|---|---|---|
| 6,964,694 B2 | 11/2005 | Rauchfuss et al. | |
| 2003/0057581 A1* | 3/2003 | Lu et al. ........................... | 264/30 |
| 2005/0247131 A1 | 11/2005 | Breuer | |
| 2006/0266119 A1* | 11/2006 | Cobb .............................. | 73/579 |
| 2007/0113655 A1* | 5/2007 | Reed ............................... | 73/606 |
| 2007/0144260 A1 | 6/2007 | Fei et al. | |
| 2007/0199380 A1 | 8/2007 | Daoud | |
| 2007/0266547 A1* | 11/2007 | Shi .................................. | 29/594 |
| 2007/0266789 A1 | 11/2007 | Hampton et al. | |
| 2007/0266790 A1* | 11/2007 | Gunasekaran et al. ......... | 73/624 |
| 2008/0057267 A1* | 3/2008 | Brocheton et al. ............ | 428/116 |

FOREIGN PATENT DOCUMENTS

JP 2006106011 A * 4/2006

OTHER PUBLICATIONS

Papadakis EP "Ultrasonic Wave Meausrements of Elastic Moduli and for Product Development and Design Calculations"; ASTM International, Standard Worldwide; ISSN: 0090-3973, May 1, 1998; Abstract Only.

* cited by examiner

*Primary Examiner* — Hezron E Williams
*Assistant Examiner* — Rose M Miller
(74) *Attorney, Agent, or Firm* — Robert P. Santandrea (57) ABSTRACT

Systems (50) and methods for measuring and displaying a visual and/or graphical representation of the specific modulus (E/ρ) of a cellular ceramic body (10), such as those used to form particulate filters, are disclosed. The ultrasonic measurement system employs an ultrasonic transmitter (52T) and an ultrasonic receiver (52R) adjacent to, but spaced apart from respective ends (16, 18) of the ceramic body. Multiple ultrasonic waves (80) are sent through corresponding multiple longitudinal portions (12P) of the honeycomb structure (12), where adjacent longitudinal portions overlap. Time of flight (TOF) measurements (TOF1, TOF2), along with other parameters describing the ceramic body, allow for the measurement of the sonic speed ($c_{mat}$) of the ultrasonic waves that pass through the ceramic body as well as the attenuation (IR). The specific modulus is then calculated from the square of the sonic speed ($C^2_{mat}$). The high resolution of the ultrasonic measurements allows for improved evaluation of the manufacturing process.

10 Claims, 8 Drawing Sheets

SYSTEMS AND METHODS FOR MEASURING THE SPECIFIC MODULUS OF CELLULAR CERAMIC BODIES

FIELD

The present invention relates to measuring properties of cellular ceramic bodies such as used to form particulate filters, and in particular relates to systems and methods for measuring the specific modulus of fired or green cellular ceramic bodies.

BACKGROUND

Ceramic bodies having honeycomb structures are used to form particulate filters for a variety of filter-based applications, such as vehicular exhaust systems, to reduce pollutants. Such structures generally comprise a network of interconnected web walls that form a matrix of elongated, gas-conducting cells that may have, for example, a square, octagonal or hexagonal cross-sectional shape. A cylindrical outer skin that is integrally connected to the outer edges of the web walls surrounds the network of web walls such that a round-shaped or an oval-shaped cross-sectional structure is formed having opposing inlet and outlet ends for receiving and expelling exhaust gases through the matrix of cells.

It is useful to be able to measure and characterize various properties of ceramic bodies without damaging or destroying the honeycomb structure. Such measurement and characterization assist in determining whether there are faults (e.g., cracks or fractures, deformities, density variations, etc.) and whether the product conforms to the design specifications. Generally, such measurements provide insight into the manufacturing process and can thereby be used to improve the process.

One particularly useful property of a ceramic body is its "specific modulus," which is a measure of an object's ability to be non-permanently deformed and can be considered an indicator of the object's resistance to breakage. Basically, the specific modulus of a material is the elastic (Young's) modulus divided by the density. This parameter is useful in comparing different materials in designing the object. The specific modulus of an object can be determined by measuring the strain placed on the object in response to an applied stress, normalized by the object's density. The specific modulus of a ceramic body yields information about its composition, its brittleness, etc. The measured specific modulus can also be compared to a specified value to assess whether a particular ceramic body meets production specifications.

SUMMARY

One aspect of the invention is a method of measuring the specific modulus of a ceramic honeycomb structure having first and second ends. The method includes positioning an ultrasonic transmitter and an ultrasonic receiver adjacent to, but not in contact with, the first and second ends, respectively, so as to define an ultrasonic path between the transmitter and receiver that has an associated first time of flight (TOF1) in the absence of the ceramic honeycomb structure. The method also includes propagating a pulse of ultrasonic waves from the transmitter to the receiver through a longitudinal portion of the honeycomb structure. The method further includes receiving at the ultrasonic receiver the ultrasonic waves exiting the longitudinal portion. The method also includes determining a second time of flight (TOF2) from the received ultrasonic waves and calculating a sonic velocity $c_{mat}$ using TOF1 and TOF2, and then calculating the specific modulus $E/\rho=c^2_{mat}$ for the longitudinal portion.

Another aspect of the invention is a system for measuring the specific modulus of a ceramic honeycomb structure having first and second ends. The system includes an ultrasonic transmitter arranged adjacent to, but not in contact with, the first end, and an ultrasonic receiver arranged adjacent to, but not in contact with, the second end, so as to define an ultrasonic path between the transmitter and the receiver. The receiver is configured to receive ultrasonic waves from the ultrasonic transmitter that travel through a longitudinal portion of the honeycomb structure and form therefrom corresponding electrical receiver signals. The system also includes a controller operably connected to the ultrasonic transceiver and configured to receive the electrical receiver signals, determine time-of-flight information therefrom, and thereby calculate a sonic velocity $c_{mat}$ and a specific modulus $E/\rho=c^2_{mat}$ for the longitudinal portion.

Another aspect of the invention is a method of measuring specific modulus values of a ceramic honeycomb structure having first and second ends connected by a plurality of cells. The method includes positioning an ultrasonic transmitter and an ultrasonic receiver in opposition and establishing a first time of flight (TOF1) in air therebetween. The method then includes disposing the ceramic honeycomb structure in between the transmitter and receiver so that the transmitter and receiver are adjacent to, but not in contact with, the first and second ends, respectively. The method further includes propagating multiple pulses of ultrasonic waves from the transmitter to the receiver through the honeycomb structure over corresponding multiple longitudinal portions of the honeycomb structure, wherein adjacent longitudinal portions partially overlap. The method also includes receiving the multiple propagated ultrasonic waves at the ultrasonic receiver and generating multiple electrical receiver signals in response thereto. The method also includes determining second times-of-flight (TOF2) from the multiple receiver electronic signals and calculating respective sonic velocities $c_{mat}$ using TOF2 and TFO1. The method also includes calculating corresponding multiple specific moduli $E/\rho=c^2_{mat}$.

These and other advantages of the invention will be further understood and appreciated by those skilled in the art by reference to the following written specification, claims and appended drawings.

DETAILED DESCRIPTION

Reference is now made in detail to example embodiments of the invention, examples of which are illustrated in the accompanying drawings. Whenever possible, the same or like reference numbers and symbols are used throughout the drawings to refer to the same or like elements or components.

Figure 1:
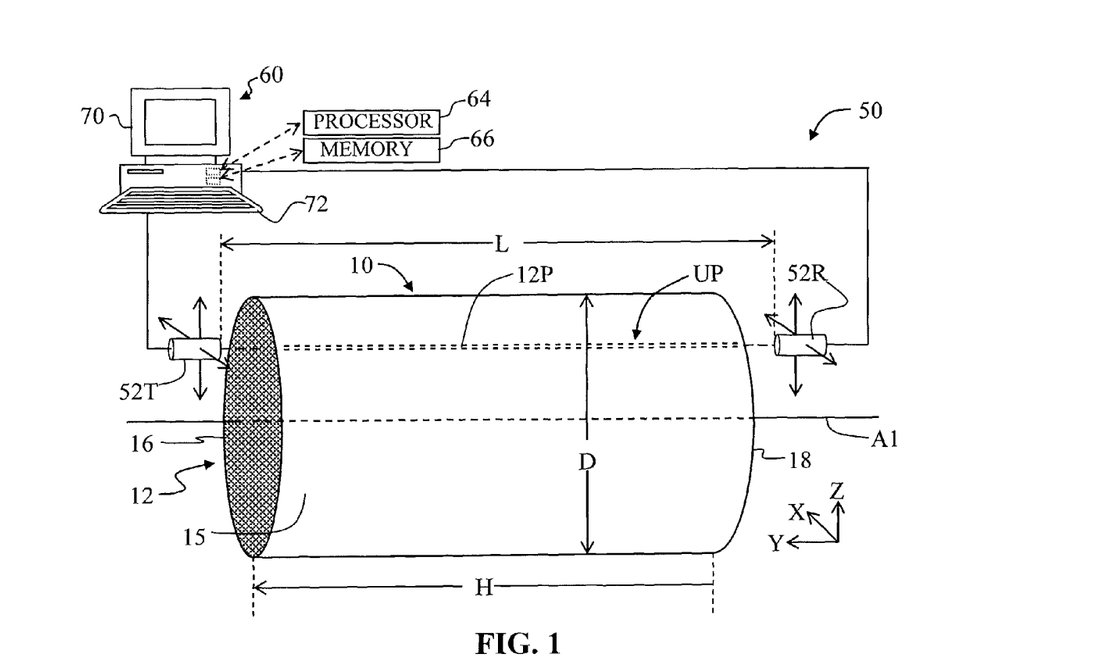
FIG. 1 is a perspective view of an example embodiment of an ultrasonic measurement system used to perform the methods of the present invention, shown with a ceramic body operably arranged therein.
Figure 2:
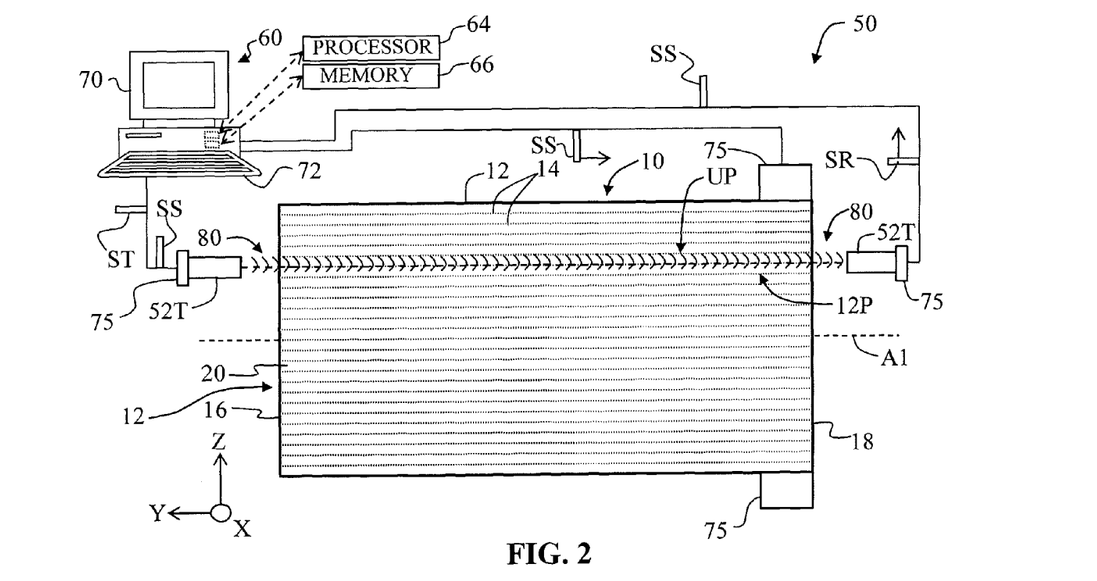
FIG. 2 is a side view of the ultrasonic measurement system and ceramic body of FIG. 1, showing ultrasonic waves passing longitudinally through a longitudinal portion of the honeycomb structure.

FIG. 1 is a perspective view of an example embodiment of an ultrasonic measurement system 50 used to perform the methods of the present invention, shown with a ceramic body 10 operably arranged therein. FIG. 2 is a side view of the ceramic body 10 and ultrasonic measurement system 50 of FIG. 1. Ceramic body 10 has a honeycomb structure 12 having an axial height H and a central axis A1 that defines an axial (longitudinal) direction. Cartesian coordinates are provided for the sake of reference. Honeycomb structure 12 is formed by a matrix of intersecting, thin, porous walls 14 surrounded by an outer wall 15. Walls 14 extend across and between opposing ends 16 and 18, and form a large number of adjoining hollow passages or "cells" 20 that also extend between, and are open at, end faces 16 and 18.

Figure 3A:
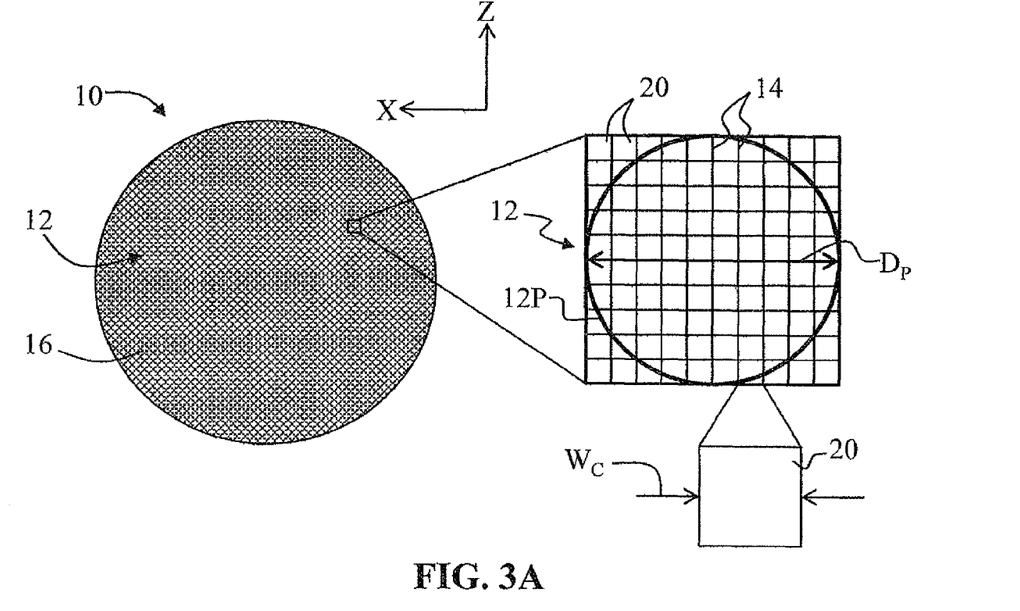
FIG. 3A is a close-up view of an input end of the ceramic body and includes close-up insets that show an example end-view of the longitudinal portion of the ceramic body through which the ultrasonic waves travel, and an example single cell.

FIG. 3A is a close-up view of an input end of the ceramic body and, in a first inset, shows a close-up end-view of an example of a longitudinal portion 12P of ceramic body 10 through which ultrasonic waves (discussed below) travel. The example longitudinal portion 12P has a circular cross-section of a diameter $D_P$, which is defined by the "spot size" diameter of a transmitter 52T and a receiver 52R.

In an example embodiment, ceramic body 10 is used to form a flow-through catalyst filter and has, for example, between 100 to 900 cells per square inch, which translates into a cell width $W_C$ that can range from between about 2.5 mm to about 0.85 mm. Walls 14 of such a ceramic body 10 are typically rendered quite thin, e.g., on the order of 2-10 mils thick, or even 2-6 mils thick. Other filter types (e.g., smokestack filters) utilize ceramic bodies 10 having on the order of 50 cells per square inch, which translates into a cell width of about 3.6 mm.

An example ceramic body 10 used to form a diesel particulate filter has between about 100 and 400 cells per square inch and walls 14 that are generally thicker, e.g., on the order of 10-25 mils thick, or even 12-16 mils thick. The corresponding cell widths $W_C$ are in the range from about 8 mm to about 1.25 mm (see FIG. 3A, second inset)

Figure 3B:
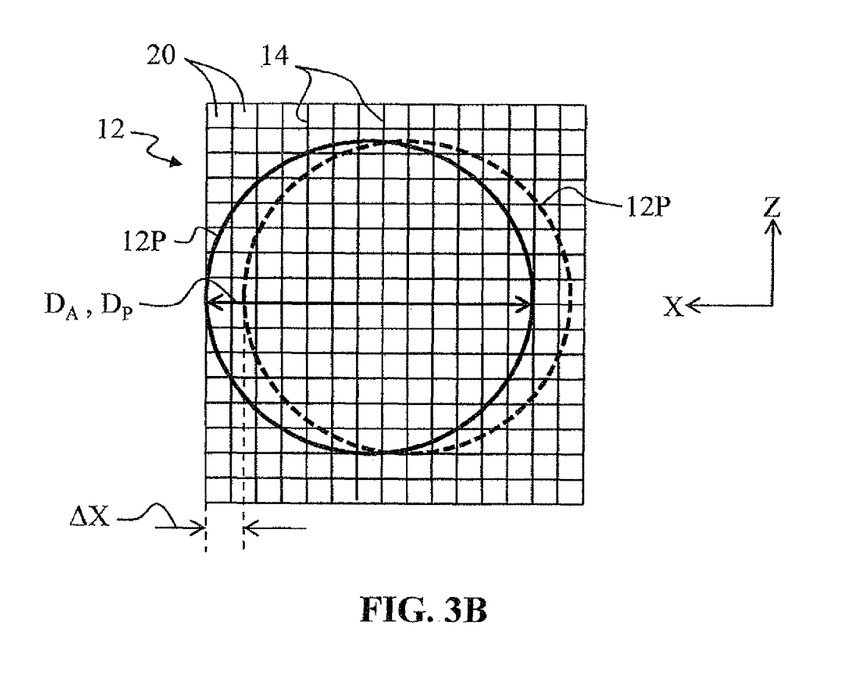
FIG. 3B is a close-up view of cross-sections of adjacent longitudinal portions through which the ultrasonic waves travel through the ceramic body, illustrating how the longitudinal portions partially overlap when the transmitter and detector are moved in increments smaller than the "spot size" diameter of the transmitter.

FIG. 3B is a close-up view of two adjacent longitudinal portions 12P, with one of the portions denoted by a dotted line. For a typical transmitter/detector resolution or "spot size" of a diameter $D_A=D_P=0.5"$ (i.e., 12.7 mm in diameter), each longitudinal portion 12P through which an ultrasonic acoustic wave ("ultrasonic wave") 80 travels contains at least tens of cells 20.

By way of example, for cells 20 wherein cell width $W_C=1.27$ mm and $D_A=D_P=12.7$ mm, each longitudinal portion 12P includes about 80 cells 20. This serves to provide an averaging effect over a number of cells 20 and walls 14 of honeycomb structure 12. As each longitudinal portion 12P is incremented (shifted) by small amounts (i.e., much smaller than the transmitter/receiver spot size, e.g., 1 mm), a type of moving average of the time of flight (TOF) of ultrasonic wave 80 through ceramic body 10 is obtained by virtue of the partial overlap of adjacent longitudinal portions.

With reference to FIG. 2 and to FIG. 3B, in an example embodiment, transmitter 52T and receiver 52R are stepped in corresponding X-Z planes by increments of $\Delta$ (e.g., $\Delta X$ and $\Delta Z$ in the X and Z directions, respectively), wherein $\Delta \leq (0.1)D_P$. This creates substantial partial overlap of adjacent longitudinal portions 12P.

Ceramic body 10 is manufactured, for example, by extruding a plasticized ceramic-forming precursor of cordierite, mullite, silicon carbide, or aluminum titanate through an extrusion die. The extruded "green body" is then cut and dried. Such green bodies are quite fragile and must be transported to a kiln, wherein the heat transforms the relatively soft and fragile green body into hardened, fired ware with rigid honeycomb structure 12.

During the manufacturing process, inhomogeneities can and do occur in honeycomb structure 12. Such inhomogeneities include, for example, wall thickness variations within the interior of the structure, wall orientation and/or waviness, and geometrical deformities. The inhomogeneities also include microstructural variations such as density differences, variations in porosity and variations in amounts of microcracks. These inhomogeneities and variations impact the structural integrity of honeycomb structure 12 and influence the value of the specific modulus of the honeycomb structure.

Ultrasonic measurement system 50 includes ultrasonic transmitter ("transmitter") 52T and ultrasonic receiver ("receiver") 52R arranged in opposition to define an ultrasonic path UP through each longitudinal portion 12P of honeycomb structure 12. In an example embodiment, transmitter 52T and receiver 52R are piezoelectric transducers of the type well known in the art. In an example embodiment, ultrasonic measurement system 50 is adapted for use from an existing ultrasonic measurement system, e.g., the system available from model SIA7 of VN Instruments Inc., or from model iPASS of Ultran Inc. Transmitter 52T and receiver 52R may constitute single-element transducer pairs, or they may each be formed from a transducer array.

Transmitter 52T and receiver 52R are generally aligned in the direction of central axis A1, and are preferably precisely aligned relative thereto. Transmitter 52T is arranged adjacent to, but not in contact with, end 16, while receiver 52R is arranged adjacent to, but not in contact with, end 18.

Transmitter 52T and receiver 52R are each electrically connected to a controller 60 that includes a digital processor unit 64 configured to process electrical receiver signals SR produced by receiver 52R and received by the controller, as discussed below. Digital processor unit 64 is configured to filter the noise in receiver signals SR resulting from reflections of the ultrasonic waves 80 when the waves pass between the transmitter 52T and receiver 52R through honeycomb structure 12.

In an example embodiment, controller 60 includes a memory unit 66 that is electrically connected to digital processor 64 and serves as a computer-readable medium for storing data and other information (e.g., processed data, computer-readable instructions, raw data from electrical signals SR, etc.). In an example embodiment, ultrasonic measurement system 50 includes a display 70 operably connected to controller 60 and configured to display visual and/or graphical representations of information (data) obtained by the ultrasonic measurements of one or more ceramic bodies 10. In an example embodiment, controller 60 is or includes a programmable computer having digital processing capability such as a desktop computer, laptop computer, or a work station. In an example embodiment, processor 64 is configured to run image-processing software such as WiT, available from Dalsa Corporation of Ontario, Canada.

In the general operation of ultrasonic measurement system 50, controller 60 generates a control signal ST and sends it to transmitter 52T, which generates a short burst (pulse) of ultrasonic waves 80 in response thereto. Preferably, ultrasonic waves 80 have a frequency f of between about 100 kHz to about 1 MHz.

Figure 4:
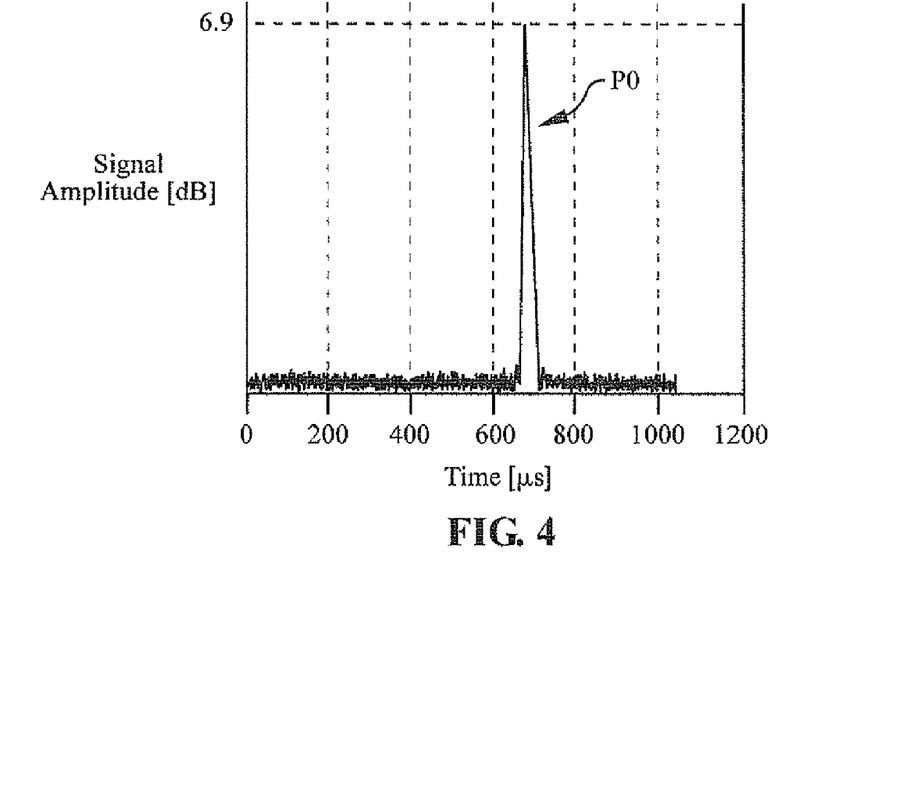
FIG. 4 is a representative plot of the signal amplitude (dB) versus time (μs) of an example trace of detected ultrasonic waves in open air, and shows an open air peak ($P_O$) that corresponds to the stand-off distance between the transmitter and receiver.

Prior to or after sending ultrasonic waves 80 through ceramic body 10, the ceramic body is removed and a first—or "baseline"—time of flight (TOF1) of the waves in air is measured between transmitter 52T and receiver 52R. TOF1 is given by TOF1 = $L/c_{air}$, where L is the total distance separating the transmitter and receiver, and $c_{air}$ is the speed of sound in air. FIG. 4 is a representative plot of signal amplitude (dB) versus time (μs) of an example trace of detected ultrasonic waves 80 passing through open air between transmitter 52T and receiver 52R. The plot of FIG. 4 shows an open-air peak $P_O$ that corresponds to stand-off distance L (FIG. 1) between transmitter 52T and receiver 52R.

Once the baseline TOF1 is determined, ceramic body 10 is placed in between transmitter 52T and receiver 52R. Controller 60 once again sends control signal $S_T$ to transmitter 52T to generate another pulse of ultrasonic waves 80. This time, ultrasonic waves 80 traverse honeycomb structure 12 via longitudinal portion 12P.

A second time of flight (TOF2) of ultrasonic waves 80 through longitudinal portion 12P of honeycomb structure 12 is given by:

$$TOF2 = (L-H)/c_{air} + H/c_{mat},$$

where $c_{mat}$ is the "sonic velocity" in the honeycomb structure.

The sonic velocity $c_{mat}$ for longitudinal portion 12P of honeycomb structure 12 is then calculated via the relationship:

$$c_{mat} = H \cdot c_{air}/\{H - C_{air} \cdot (TOF1 - TOF2)\}.$$

The specific modulus E/ρ is proportional to the square of the sonic velocity, and is expressed in general form as:

$$E/\rho = k(\upsilon, d_{cell}, t_{wall}) \cdot c^2_{mat}$$

where k is a correction factor that includes Poisson's ratio $\upsilon$, which accounts for the cell cross-sectional geometry (circle, square, rectangle, hexagon, etc.), $d_{cell}$ is an average (ideal) diameter of the cells, and $t_{wall}$ is an average (ideal) wall thickness of the cells. Here, E is the Young's modulus of the structure and ρ is its density.

The propagation of ultrasonic waves 80 through each longitudinal portion 12P is a relatively complex process. Dispersion, or change of wave speed at different frequencies, occurs as the initial ultrasonic pulse starts to propagate from one end of ceramic body 10 to the other. Also, the cross-sectional geometry of cells 20, their dimensions, and possible anisotropic material properties of walls 14 and their associated large porosity also affect the mode of wave propagation and the sonic velocity.

The methods of the present invention use a relatively low ultrasonic frequency f, e.g., approximately a 500 kHz center frequency in the aforementioned range of about 100 kHz to about 1 MHz. At these frequencies, the corresponding ultrasonic wavelength λ (e.g., about 1 meter in air for 1 MHz) is much larger than the cell size (i.e., the cell width $W_C$) and the microstructural features (e.g., the pores and crystal domains) of ceramic body 10.

Consequently, the underlying ceramic material appears substantially isotropic to the ultrasonic waves 80. Further, the mode of ultrasonic wave propagation is also simplified so that it is non-dispersive at the test frequency f. Thus, the methods of the present invention set the correction factor k=1 as a reasonable simplification of otherwise complex ultrasonic wave propagation since the invention seeks to obtain integrated (averaged) measurements of the specific modulus E/ρ in the longitudinal direction of honeycomb structure 12 over a large number (hundreds, more preferably thousands, and even more preferably tens of thousands) of partially overlapping longitudinal portions 12P. The method is able to discern variations in the specific modulus E/ρ over areas as small as 1 mm², which is a much higher resolution than that provided by prior art techniques used to date. False-color images based on such high resolution data can provide detailed information in visual form about the particular ceramic body 10 being measured.

Since k=1, the equation for the specific modulus becomes $$E/\rho = c^2_{mat},$$

so that the terms "specific modulus" and "square of the sonic velocity" become synonymous. Accordingly, these terms are used interchangeably herein.

In an example embodiment, the attenuation or "integrated response" IR of ultrasonic waves 80 that propagate through longitudinal portions 12P is also measured. The determination of TOF1 also provides a baseline ultrasonic power $P_1$ for ultrasonic waves 80 traveling in air, while the measurement of TOF2 provides a second measurement of ultrasonic power $P_2$ for the ultrasonic waves received by receiver 52R after they have passed through ceramic body 10. The difference between the baseline and measured ultrasonic powers $P_1$ and $P_2$ provides a measure of the ultrasonic attenuation, i.e., IR = ($P_2 - P_1$). This attenuation can be expressed in decibels (dB) via the relationship:

$$IR(dB) = 10 \log(P_2/P_1).$$

Note that the measurement resolution for attenuation IR is essentially the same as that for the specific modulus E/ρ=$c^2_{mat}$, i.e., on the order of 1 mm².

In order to calculate the specific modulus $E/\rho$ for a set of (x, z) locations over the entire cross-section of ceramic body 10, transmitter 52T and receiver 52R are periodically re-located (e.g., stepped) in their respective X-Z planes, and the transmitter is periodically activated. In one example embodiment, this relocation involves repositioning ceramic body 10 relative to transmitter 52T and receiver 52R via a movable stage 75 operably connected to controller 60 and controlled by stage signals SS. Alternatively, transmitter 52T and receiver 52R are attached to respective stages 75 operably connected to controller 60 and configured to synchronously move in their respective X-Z planes while remaining substantially aligned with each other via stage signals SS.

Figure 5:
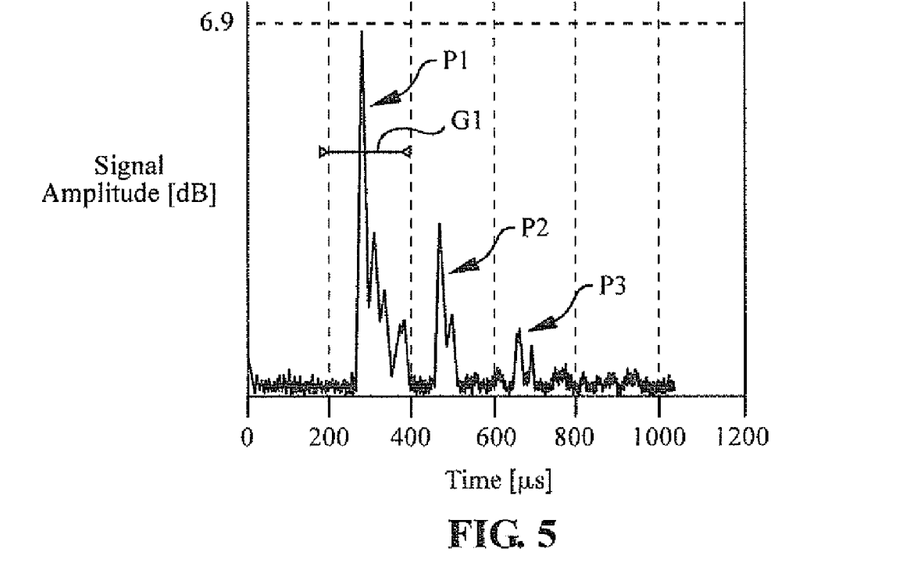
FIG. 5 is a representative plot similar to that of FIG. 4, but for ultrasonic waves that travel through a longitudinal portion of the ceramic body when a ceramic body is inserted in the space between the transmitter and receiver while the same stand-off distance is maintained.

Each activation of transmitter 52T results in the generation of the aforementioned pulse of ultrasonic waves 80, which pass through the corresponding longitudinal portion 12P of substrate 12 and are subsequently detected at receiver 52R. FIG. 5 is a plot similar to that of FIG. 4, but that is representative of ultrasonic waves 80 traveling through longitudinal portion 12P of ceramic body 10. The plot shows a peak P1 that represents the arrival time of the ultrasonic waves 80. Peaks P2 and P3 represent multiple reflections from the ends of ceramic body 10 and may be ignored. In an example embodiment, the value for TOF2 is calculated using the location of the maximum of peak P1 (e.g., by using a timing gate G1 at receiver 52R)

Upon detecting ultrasonic waves 80 exiting ceramic body end 18, receiver 52R generates an electrical receiver signal SR in response thereto. This receiver signal SR is conducted to controller 60 and digital processor unit 64 therein, or alternatively to memory unit 66 where it is stored for later processing. The collection of electrical receiver signals SR over the entire cross-section of ceramic body 10 forms a raw data set $D_0$, which can be stored in memory unit 66 of controller 60 in a raw data set file. A number of such data sets ($D_{01}$, $D_{02}$, etc.) can be formed for different ceramic bodies ("parts") 10 and stored for subsequent processing and analysis.

For a ceramic body 10 where diameter D=5.66", a 6.5"×6.5", the scan is typically performed using a step size of Δ=0.04" (i.e., about 1 mm). This generates about 26,400 measurements. For larger bodies, a 10"×10" (i.e.,25.4 mm×25.4 mm) scan can be performed, which generates about 62,500 measurements.

Digital processor unit 64 processes raw data set $D_0$ to calculate, for example, the material velocity $c_{mat}$, the specific modulus $E/\rho=c^2_{mat}$ and the attenuation IR based on the above equations. This is referred to as an "ultrasonic C-scan." The ultrasonic C-scan provides integral measurements of the material velocity $c_{mat}$, the specific modulus $E/\rho=c^2_{mat}$ and the attenuation IR in the Y-direction, thereby resulting in cross-sectional "images" (in the X-Z plane) for these parameters.

Comparison of Methods to Prior Art Methods

Figure 6:
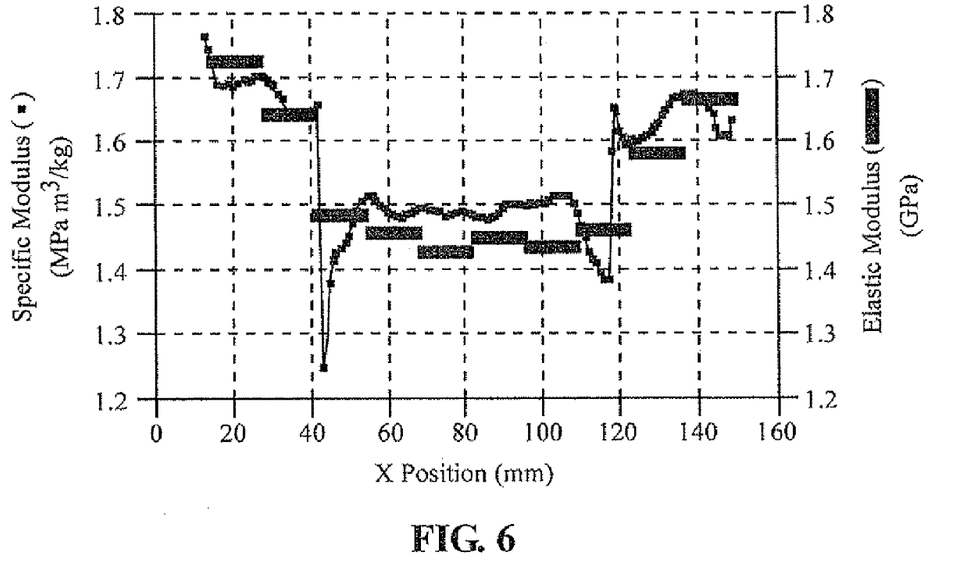
FIG. 6 plots the specific modulus $E/\rho(MPa-m^3/kg)$ on the left-hand vertical axis as measured using the methods of the present invention, the elastic modulus (GPa) on the right-hand vertical axis as measured using prior art sonic-resonance-based techniques, with the horizontal axis representing the X-position (mm) across the center of an aluminum-titanate (AT)-based ceramic body.

FIG. 6 plots the specific modulus $E/\rho$ (MPa-m$^3$/kg) on the left-hand vertical axis as measured on an example ceramic body 10 using the methods of the present invention. The elastic (Young's) modulus (in units of GPa) as measured using a prior art sonic resonance-based technique is plotted on the right-hand vertical axis. The horizontal axis is the X-position (mm) across the center of the example ceramic body 10. The particular ceramic body 10 measured was formed from aluminum-titanate (AT) and had a diameter of about 140 mm, or about 5.5".

The solid horizontal bars in the plot of FIG. 6 correspond to the resolution of the prior art measurement technique. The dashed line and small squares in the plot of FIG. 6 represent the specific modulus $E/\rho=c^2_{mat}$ of the left-hand axis. The plot of FIG. 6 shows that the two measurement techniques are in general agreement as to the overall variation of specific modulus as a function of position across the center of the example ceramic body 10. However, the specific modulus $E/\rho=c^2_{mat}$ as determined using the systems and methods of the present invention (as indicated by the dashed-line curve) provides a much higher resolution (i.e., by a factor of about 20) than that offered by the prior art sonic resonance system and methods.

In particular, the specific modulus data collected using the present invention shows much more detail about the variations in specific modulus as a function of position. This, in turn, provides much more information about the variations in the structure and material properties of ceramic body 10, and in particular about the frequency of the material variations therein. Having a greater resolution in specific modulus measurement allows easier discernment of the nature of the material variations, which therefore allows production problems to be more readily diagnosed and fixed.

Figure 7:
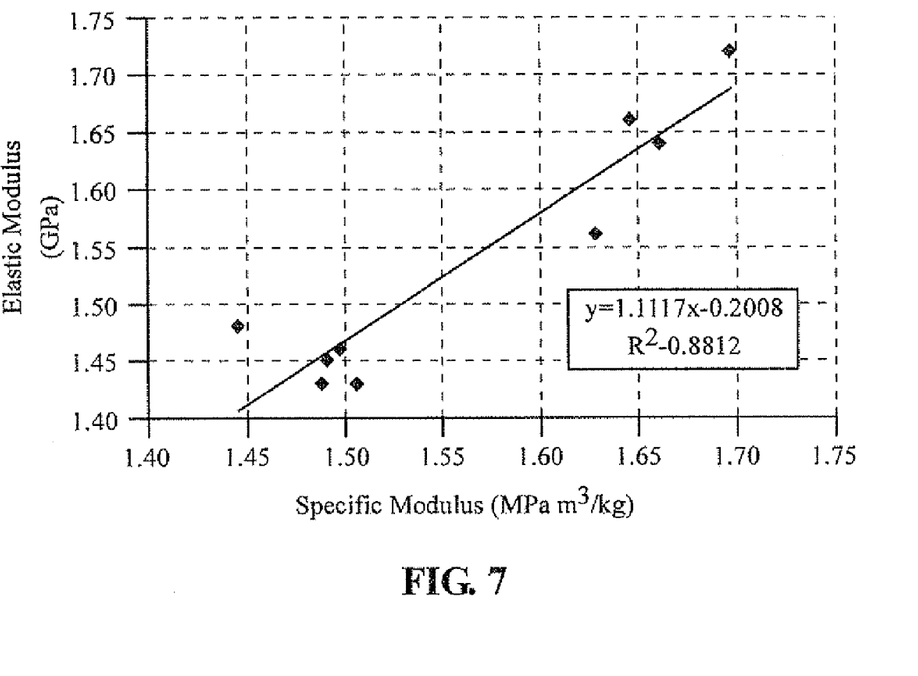
FIG. 7 is a plot of the sonic-resonance-based elastic modulus (GPa) on the vertical axis versus the specific modulus $E/\rho(MPa-m^3/kg)$ of the present invention using the data in FIG. 6 with a linear regression line drawn through the data.

FIG. 7 is a plot of the sonic-based elastic modulus (GPa) on the vertical axis versus the specific modulus $E/\rho=c^2_{mat}$ (MPa-m$^3$/kg) of the present invention using the data in FIG. 6. Linear regression analysis of the data as represented by the solid line indicates a very good general correlation of the accuracy of the prior art measurement method and the measurement methods of the present invention.

Data and Image Processing

While it is useful to generate numeric data for the sonic velocity $c_{mat}$, specific modulus $E/\rho=c^2_{mat}$ and the attenuation IR of a given ceramic body 10 for a set of (x, z) positions, it is often more useful to generate visual and/or graphical representations of the data (e.g., false color images, X-Y plots, histograms, charts, etc.) to see and understand more easily spatial trends and various material characteristics not readily apparent by examining numeric data.

Accordingly, in an example embodiment as discussed above, digital processor unit 64 is adapted (e.g., via graphics and/or imaging software) to generate visual and/or graphical representations of data processed by digital processor 62.

Figure 8:
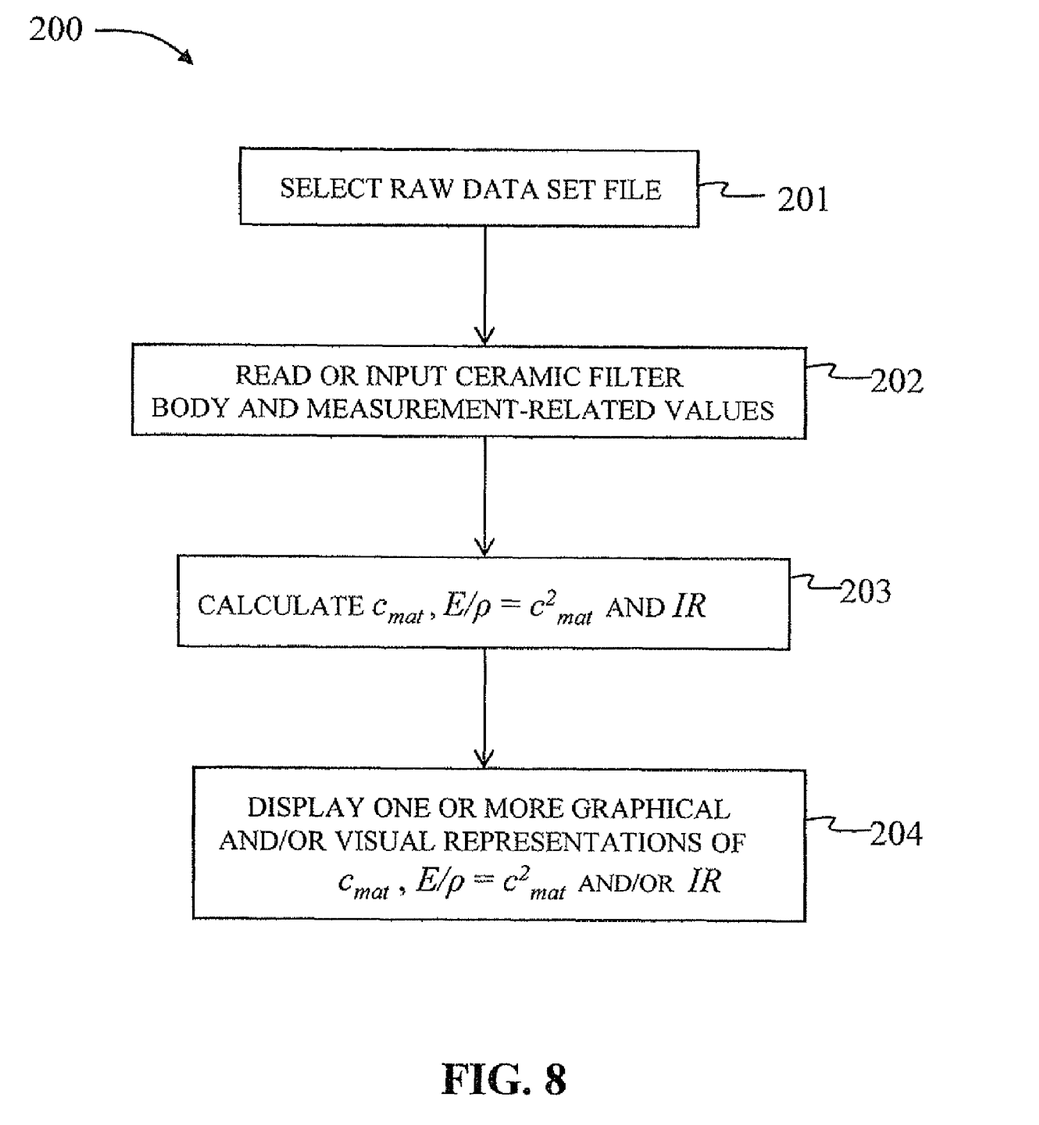
FIG. 8 is a flow diagram that illustrates an example embodiment of a general algorithm used by the controller to process a raw data set formed from the receiver electronic signals and display the processed data.

FIG. 8 is a flow diagram 200 that illustrates an example embodiment of a general algorithm used by controller 60 to process a raw data set $D_0$ formed from electrical receiver signals SR. In step 201, digital processor 64 selects and reads a particular raw data set $D_0$ located in a raw data set file in memory unit 66. In step 202, additional parameter values needed for calculating the sonic velocity $c_{mat}$, the specific modulus $E/\rho=c^2_{mat}$ and the attenuation IR are supplied by the operator or placed in memory unit 66 beforehand and are read by digital processor 64. These parameter values include, for example, the size and shape of ceramic body 10 (e.g., diameter D and height H), the precise value for $c_{air}$, the value for TOF1 and the step size Δ between measurements.

In step 203, the sonic velocity $c_{mat}$, the specific modulus $E/\rho=c^2_{mat}$ and the attenuation IR are calculated for the various (x, z) locations across the end 18 using the equations described above. This results in a first processed data set $D_1$.

In step 204, data set $D_1$ is used to generate and display one or more visual and/or graphical representations of one or more of the calculated sonic velocity $c_{mat}$, the specific modulus $E/\rho=c^2_{mat}$ and the attenuation IR.

Figure 9:
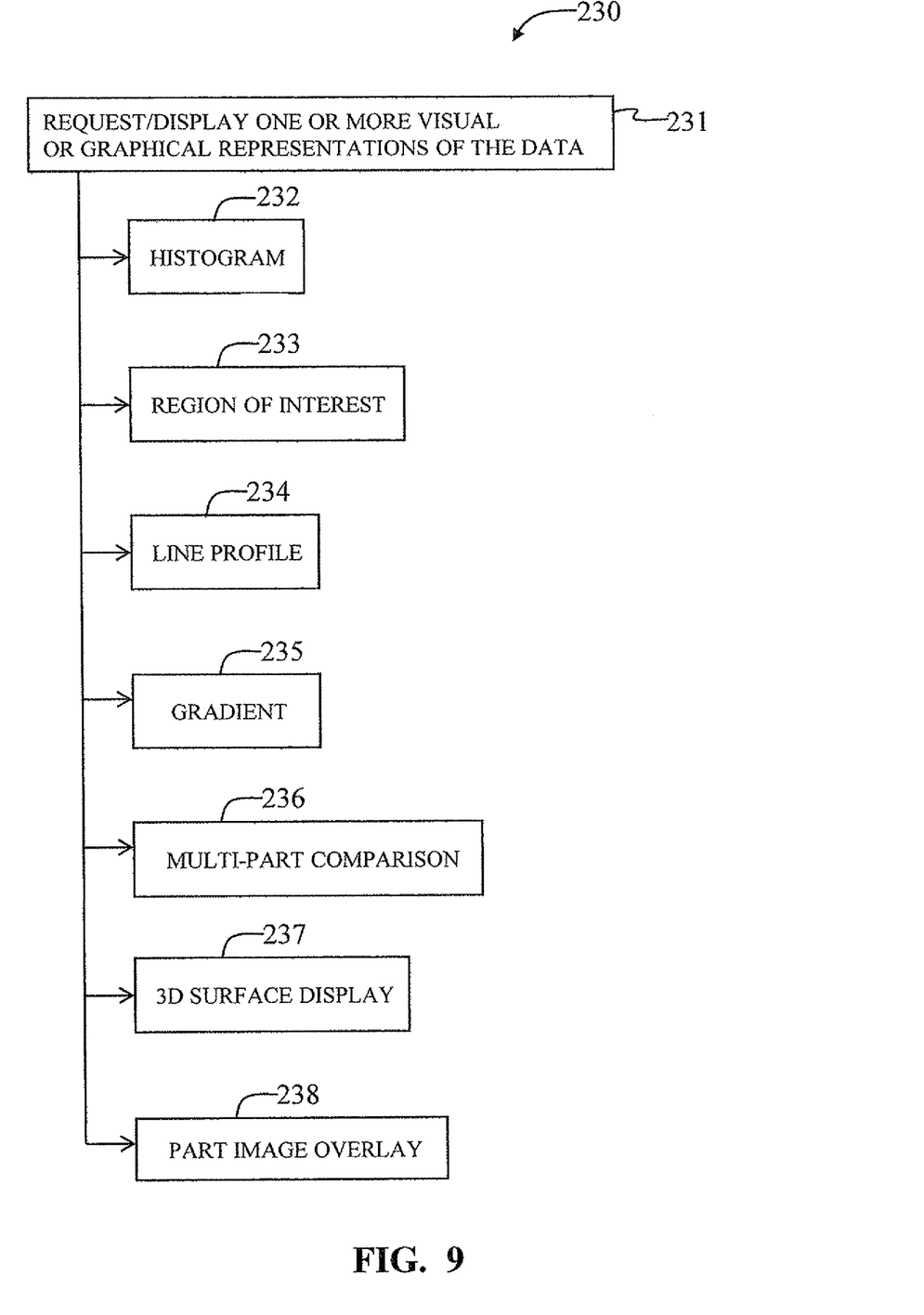
FIG. 9 is a flow diagram that illustrates an example embodiment of a number of different visual and/or graphical representations that the controller generates and displays on a display in connection with performing the ultrasonic measurement and display methods of the present invention.

FIG. 9 is a flow diagram 230 that illustrates an example embodiment of a number of visual and/or graphical representations 232-238 that can be requested to be displayed on display 70 either alone or in various combinations.

Figure 11:
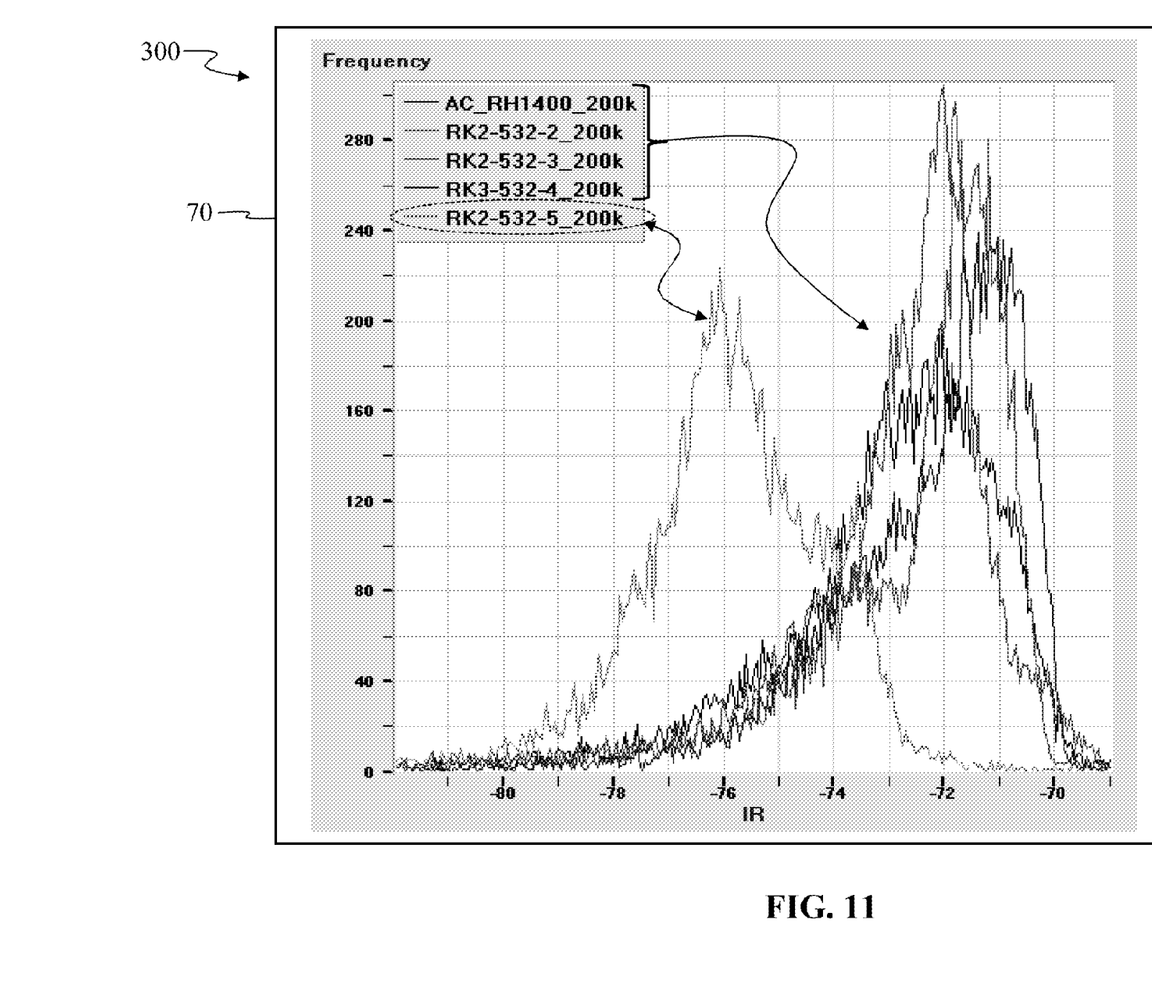
FIG. 11 is an example embodiment of a display image formed on the display that shows a graphical representation of the data in the form of a histogram of the frequency (i.e., number of measurements) vs. attenuation ("IR") for the five ceramic bodies ("parts") considered in FIG. 10.

Step 231 involves requesting the particular graphical and/or visual representation of the data desired for display. This request can be made, for example, by inputting the request to controller 60 (e.g., via an external input device 72 operably coupled to the controller, such as a keyboard, or via a display touch screen). The analysis of step 232 generates a histogram for one or more of the sonic velocity $c_{mat}$, the specific modulus $E/\rho = c^2_{mat}$ and the attenuation IR for one or more parts, or for various part regions. An example histogram for the attenuation IR is illustrated in FIG. 11 and is discussed in greater detail below.

The analysis of step 233 focuses on a particular "region of interest" of ceramic body 10 and involves calculating and displaying plots and/or images and/or statistical values relating to the particular region of interest. For example, a region of interest that might be selected is a circular on-axis region, while another region of interest might be an annular on-axis region near the outer edge of the ceramic structure. Other regions of interest can be selected based on an initial view of the data that indicates a particular region warrants closer inspection. For example, a false-color image often reveals "hot spots" where one particular color is concentrated and sharply defined relative to the surrounding regions.

The analysis of step 234 is based on a "line profile" or a select linear portion of ceramic body 10. For example, a common line profile that may be considered is one that passes through the center of the ceramic body. Such a profile provides a 1-D view of one or more of the parameters over a linear portion of ceramic body 10.

The analysis of step 235 involves calculating the "gradient" or first derivative of the data for one or more of the parameters, and displaying this information in, for example, a false-color image and/or a plot that best illustrates the rate of change of the one or more parameters.

Figure 10:
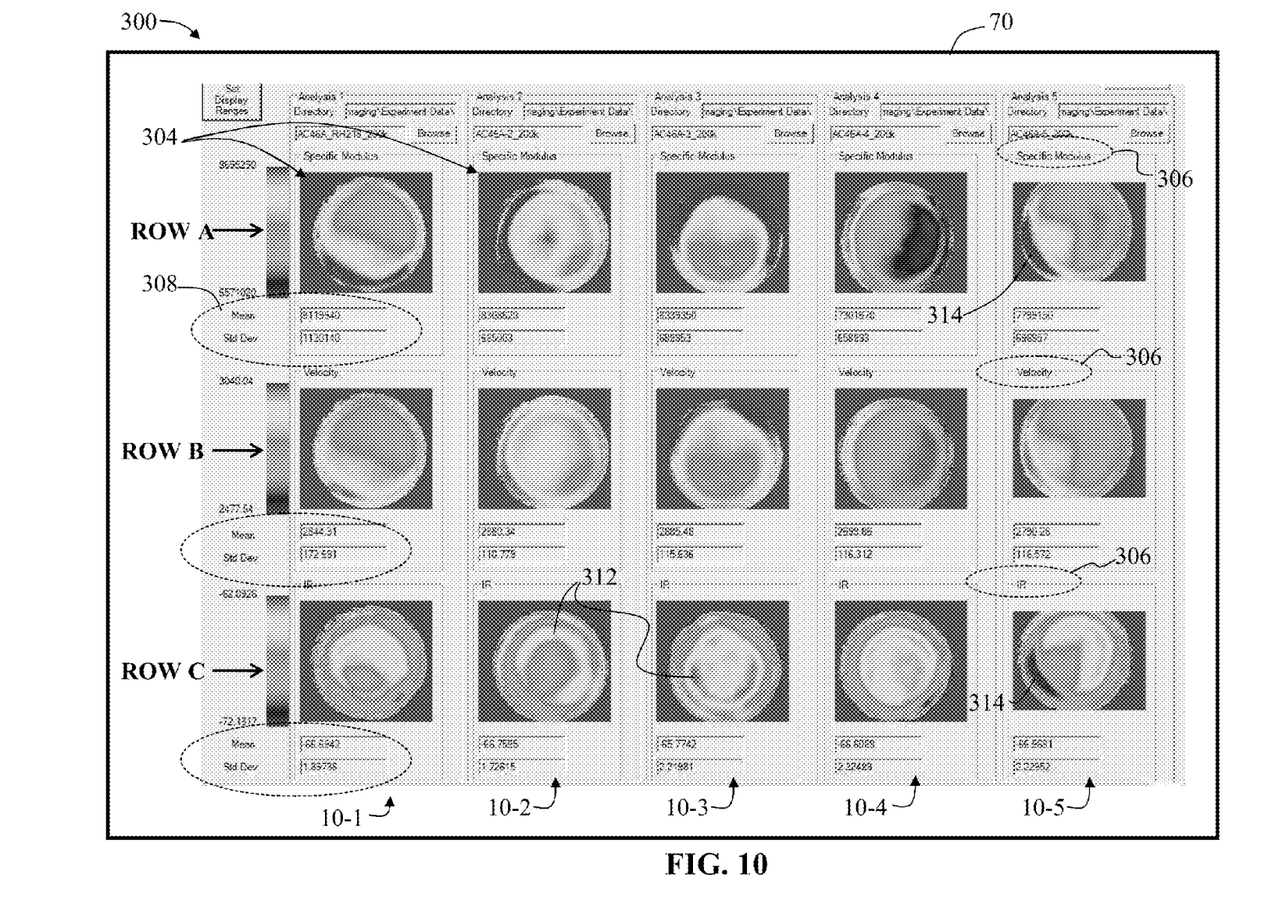
FIG. 10 is an example embodiment of a display image formed on a display wherein "false-color" images are used for the specific modulus, sonic velocity and attenuation in a multi-part comparison of five different ceramic body "parts"

The analysis of step 236 involves a "multi-part comparison," wherein data from two or more ceramic bodies ("parts") 10 are selected, analyzed and compared, e.g., via false-color images or a comparison of one or more statistics. An example of a multi-part comparison is illustrated in FIG. 10 and is discussed in greater detail below.

The analysis of step 237 involves creating a 3-D image based on a false color 3-D representation of a selected data set.

The analysis of step 238 involves a "part image overlay" that includes creating a semi-transparent, false-color image of the selected data set, and overlaying the semi-transparent image over a "real" image or representation of the part. This allows for the false-color image features to be compared to "real" features that can be seen by examining the ends of honeycomb structure 12.

All of the above visual and/or graphical representations of the data can be formed by themselves or in various combinations, and then saved to memory unit 66 or to another external memory unit such as a compact disk or "memory stick" (not shown).

FIG. 10 is an example embodiment of a display image 300 formed on display 70 for a multi-part comparison of five "parts" (i.e., five ceramic bodies 10-1, 10-2, 10-3, 10-4, and 10-5). Display image 300 includes a number of false-color images 304 (reproduced in black and white for ease of illustration in the drawings) of the specific modulus $E/\rho = c^2_{mat}$ (ROW A), the sonic velocity $c_{mat}$ (ROW B) and the attenuation IR (ROW C). Dotted-line circles 306 are provided on display image 300 to draw attention to the titles for the different images and are not necessarily part of the display image. Dotted-line circles 308 are also similarly used to note the display of statistics—in particular, the mean and standard deviation—for each parameter considered.

False-color images 304 show a number of interesting features of the measured ceramic bodies 10. For example, many false-color images 304 show particular features such as "rings" 312 or "hot spots" 314.

FIG. 11 is an example embodiment of a display image 300 formed on display 70 for a histogram of the frequency (i.e., number of measurements) vs. attenuation ("IR") for the five ceramic bodies ("parts") considered in FIG. 10. The histogram is shown in black and white for ease of illustration; in practice, it is best displayed in color to better distinguish the various data curves.

The plot of FIG. 11 illustrates that one of the parts has attenuation properties that differ significantly from the other four parts. This information can be used to distinguish parts made by different processes and/or different materials, or to understand the differences in the processes that could lead to such variations.

It will be apparent to those skilled in the art that various modifications to the example embodiments of the invention as described herein can be made without departing from the spirit or scope of the invention as defined in the appended claims. Thus, it is intended that the present invention covers the modifications and variations of this invention provided they come within the scope of the appended claims and the equivalents thereto.

What is claimed is:

1. A method of measuring the specific modulus of a ceramic honeycomb structure having first and second ends, comprising:
   a) positioning an ultrasonic transmitter and an ultrasonic receiver adjacent to, but not in contact with, the first and second ends, respectively, so as to define an ultrasonic path between the transmitter and receiver, wherein the ultrasonic path has an associated first time of flight (TOF1) in the absence of the ceramic honeycomb structure;
   b) propagating a pulse of ultrasonic waves from the transmitter to the receiver through a longitudinal portion of the honeycomb structure;
   c) receiving the ultrasonic wave exiting the longitudinal portion at the ultrasonic receiver;
   d) determining a second time of flight (TOF2) from the received ultrasonic wave and calculating a sonic velocity $c_{mat}$ using TOF1 and TOF2;
   e) calculating a specific modulus $E/\rho = c^2_{mat}$ for the longitudinal portion,
   wherein E is a Young's modulus and $\rho$ is a density of the ceramic honeycomb structure;
   repeating acts a) through e) for multiple pulses of ultrasonic waves, including passing the multiple pulses of ultrasonic waves through corresponding multiple partially overlapping longitudinal portions of the honeycomb structure, to determine multiple specific modulus values corresponding to the multiple longitudinal portions; and
   wherein the longitudinal portions have a cross-sectional diameter $D_p$, further comprising incrementing the transmitter and receiver by amounts $\Delta$ so as to form partially overlapping adjacent longitudinal portions, wherein $\Delta \leq (0.1)D_p$.

2. The method of claim 1, wherein the ultrasonic waves have a frequency in the range from about 100 kHz to about 1 MHz.

3. The method of claim 1, including measuring TOF1 between the transmitter and the receiver without the honeycomb structure in the ultrasonic path prior to or after act b).

4. The method of claim 1, further comprising displaying a visual and/or a graphical representation of the multiple specific modulus values.

5. The method of claim 1, further comprising:
measuring multiple attenuation values from the pulses of ultrasonic waves; and
displaying a visual and/or a graphical representation of the multiple attenuation values.

6. A method of measuring specific modulus values of a ceramic honeycomb structure having first and second ends connected by a plurality of cells, comprising:
   a) positioning an ultrasonic transmitter and an ultrasonic receiver in opposition and establishing a first time of flight (TOF1) in air therebetween;
   b) disposing the ceramic honeycomb structure in between the transmitter and receiver so that the transmitter and receiver are adjacent to, but not in contact with, the first and second ends;
   c) propagating multiple pulses of ultrasonic waves from the transmitter to the receiver through the honeycomb structure over corresponding multiple longitudinal portions of the honeycomb structure, wherein adjacent longitudinal portions partially overlap;
   d) receiving the multiple propagated ultrasonic waves at the ultrasonic receiver and generating multiple electrical receiver signals in response thereto;
   e) determining second times-of-flight (TOF2) from the multiple receiver electronic signals and calculating respective sonic velocities $c_{mat}$ using TOF2 and TFO1;
   f) calculating corresponding multiple specific moduli $E/\rho = c^2_{mat}$, wherein E is a Young's modulus and $\rho$ is a density of the ceramic honeycomb structure; and
   wherein the longitudinal portions have a cross-sectional diameter $D_p$, and further comprising moving the ceramic honeycomb structure relative to the transmitter and receiver by increments $\Delta$ wherein $\Delta \leqq (0.1)D_p$.

7. The method of claim 6, further comprising:
determining attenuation values from the multiple electrical receiver signals.

8. The method of claim 6, further comprising:
displaying at least one of a visual and a graphical representation of one or more of the attenuation values and the specific modulus values.

9. The method of claim 8, including displaying the at least one visual representation as a false-color image.

10. The method of claim 9, including overlaying-the false-color image onto a representation of the ceramic honeycomb structure.

* * * * *